Jan. 23, 1968 L. S. DZUNG 3,365,595

MAGNETO-DYNAMIC A.C. CAPACITANCE FOR COMPENSATING FOR REACTIVE POWER

Filed June 19, 1964 3 Sheets-Sheet 1

INVENTOR
Lang Shuen Dzung
BY
Pierce, Scheffler & Parker
ATTORNEYS

INVENTOR

Lang Shuen Dzung

BY Pierce, Scheffler & Parker
ATTORNEYS

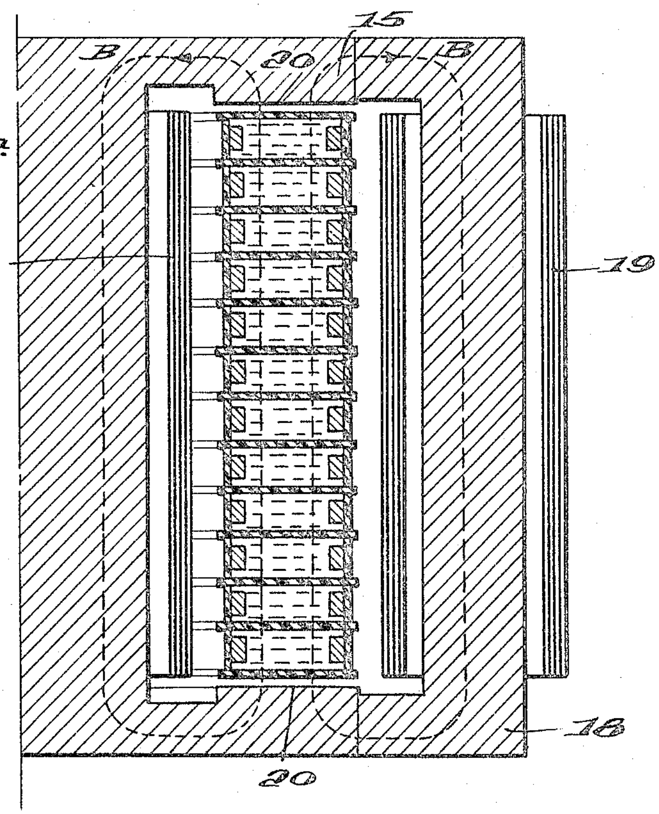
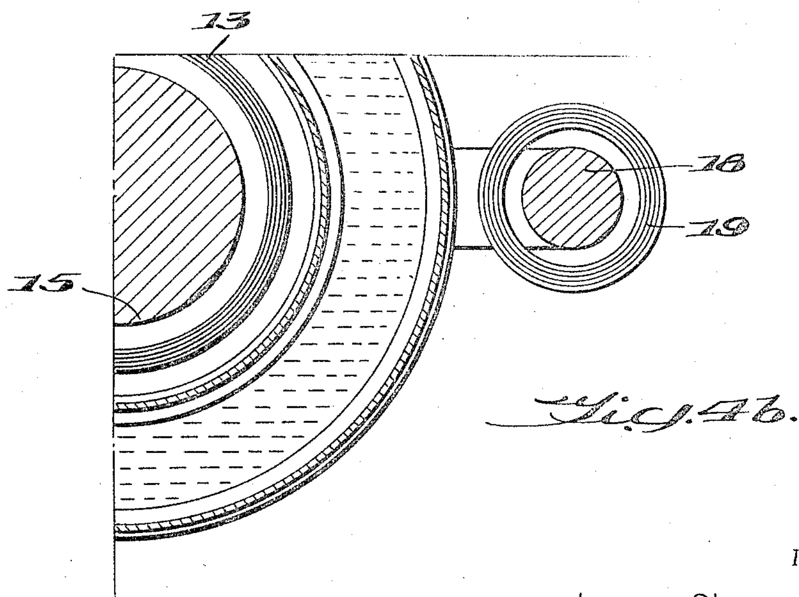
INVENTOR
Lang Shuen Dzung
BY Pierce, Scheffler & Parker
ATTORNEYS

United States Patent Office 3,365,595

Patented Jan. 23, 1968

3,365,595

MAGNETO-DYNAMIC A.C. CAPACITANCE FOR COMPENSATING FOR REACTIVE POWER

Lang Shuen Dzung, Wettingen, Aargau, Switzerland, assignor to Aktiengesellschaft Brown, Boveri & Cie, Baden, Switzerland, a joint-stock company Filed June 19, 1964, Ser. No. 376,540
Claims priority, application Switzerland, July 16, 1963, 8,881/63
11 Claims. (Cl. 310—11)

ABSTRACT OF THE DISCLOSURE

A magneto-dynamic alternating current capacitance for use in compensating for reactive power comprises one or more electrically conductive, axially aligned, non-ferromagnetic members of annular configuration which are supported for free rotation about their common axis. Each annular member can be constituted by an annular solid mounted for free rotation, or it can be constituted by a freely rotatable annular body of liquid bounded at its inner and outer peripheries by cylindrical walls which serve as electrodes. Each annular member is provided with coils energized with direct current to produce a magnetic field of essentially constant magnitude and an essentially constant direction along the axis of the member. Each annular member also has applied to it at its inner and outer peripheries an alternating current which passes through it in a radial direction.

This invention relates to electric generator apparatus of the magnetohydrodynamic type and more particularly to an improved capacitance structure for compensating the reactive power component produced by the generator.

One disadvantage of the production of direct current from flow of a hot ionized gas through a magnetic field in accordance with the magnetohydrodynamic principle is that the direct current must be inverted into an alternating current for most applications.

One known way in which alternating current can be generated by the magnetohydrodynamic principle without requiring an inverter is to excite the magnetic field either by use of an alternating current as a physically homogeneous field, or by polyphase alternating current as a traveling field. The great disadvantage of this technique is the very high reactive power component associated with production of the alternating, or traveling field, for it is usually several times greater than the effective power component. If static capacitances are used to compensate for this reactive power, the size of the capacitance, if conventional dielectric materials are used, is something like one hundred times greater than the active volume of the generator.

The primary purpose of this invention is to provide an improved construction for an alternating current capacitance for compensating the reactive power component of the generator, operation of the capacitance according to the invention also being based upon the magneto-dynamic principle, and the capacitance being much reduced in size—to approximately the same size as the active volume of the magnetohydrodynamic generator.

More particularly, the magneto-dynamic alternating current capacitance in accordance with the invention is characterized by an electrically conductive, non-ferromagnetic solid, or liquid member which experiences a constant magnetic field; alternating current is supplied to the member via suitable supply means and flows through the member perpendicular to the direction of the constant magnetic field, and the member is so disposed as to be free to move perpendicularly to the direction of the constant magnetic field as well as perpendicular to the direction of the current flow. The solid or liquid capacitance member may also be bounded by walls of insulating material.

The improved capacitance will be more readily understood from the following description of several embodiments thereof and from the accompanying drawings which represent them. In these drawings.

Figure 5:
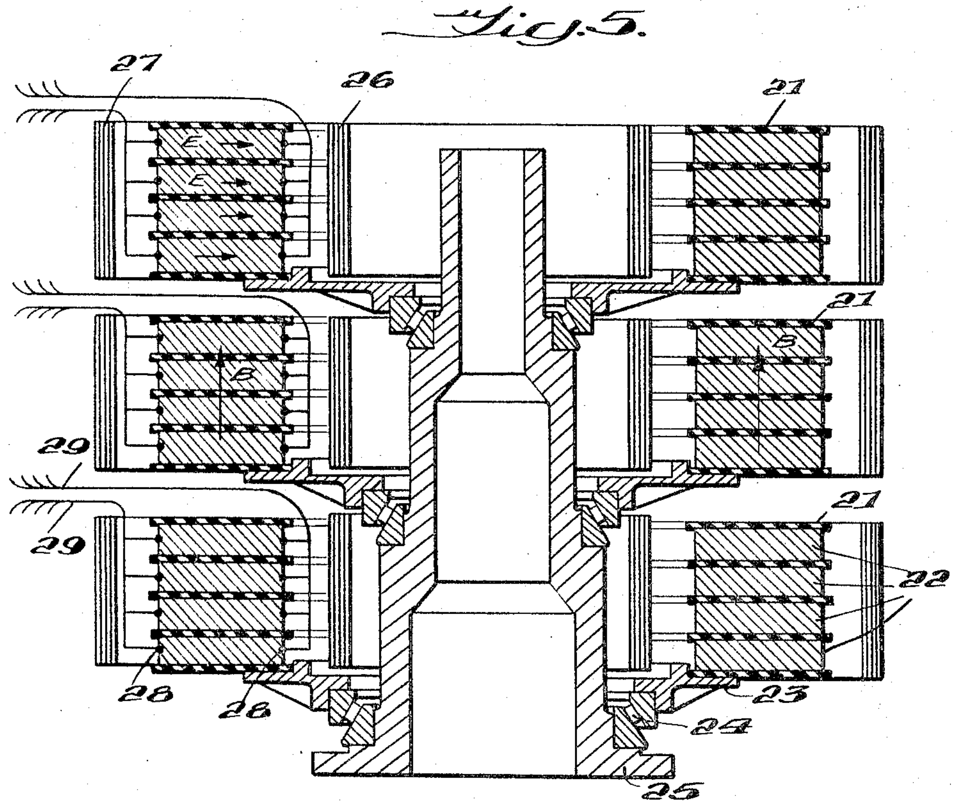
Figure 6:
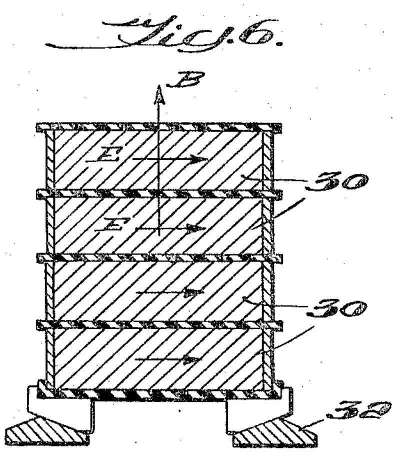
Figure 3A:
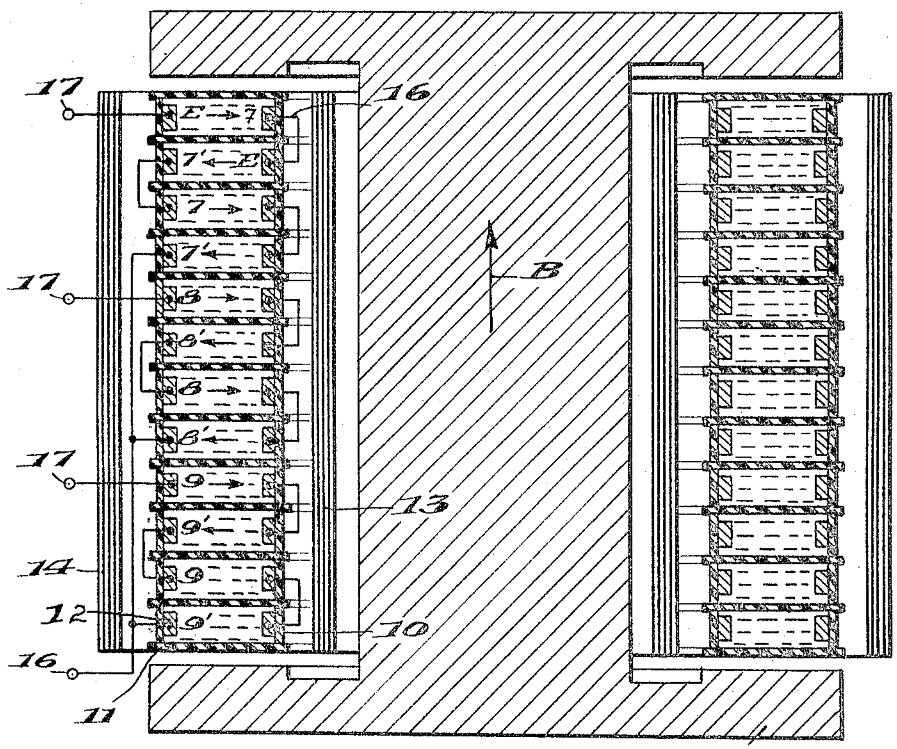
Figure 3B:
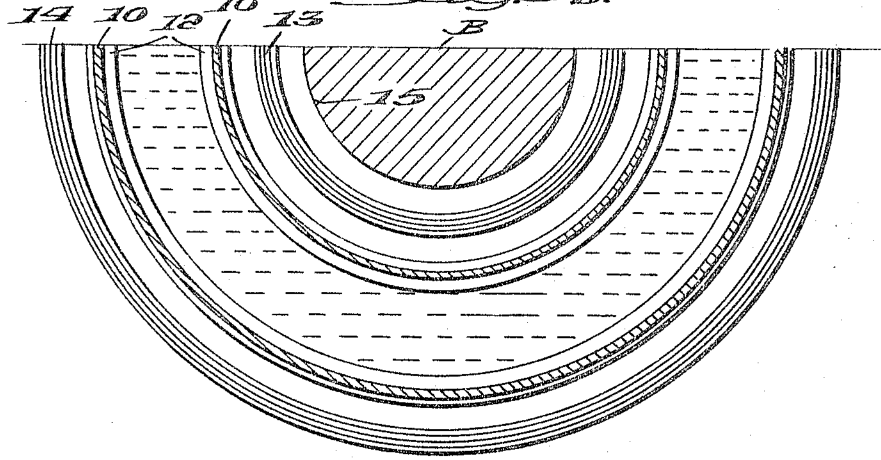

FIGS. 3*a* and 3*b* also show an annular embodiment of a liquid type capacitance according to the invention for connection to a three-phase alternating current source, FIG. 3*a* being a view in vertical central section and FIG. 3*b* being a half horizontal section;

FIGS. 4*a* and 4*b* show another embodiment of a liquid type capacitance having a shell type yoke configuration, for connection to a three-phase alternating current source, FIG. 4*a* being a view in vertical section and FIG. 4*b* being a quarter horizontal section;

FIG. 5 illustrates still another embodiment of the improved capacitance which utilizes a solid type of electrically conductive member, the view being in central longitudinal section; and FIG. 6 illustrates still another embodiment of the capacitance which features a linear construction and likewise comprises a solid, electrically conductive member.

Figure 1:
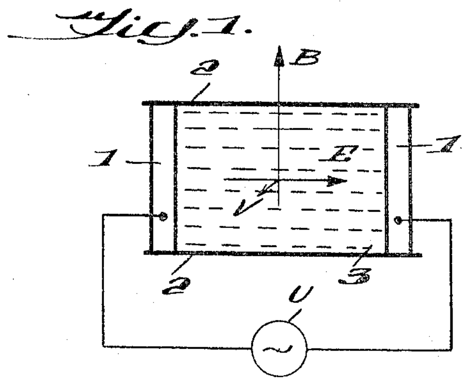
FIG. 1 is a somewhat elementary view illustrating the basic construction of the improved capacitance and which utilizes a liquid type electrically conductive member.

With reference now to FIG. 1, which illustrates the basic construction of the improved capacitance, an electrically conductive, non-ferromagnetic member in the form of a liquid 3 such as sodium, is disposed between two sets of parallel spaced boundary plates 1 and 2. The set of parallel spaced boundary plates 1 is arranged perpendicular to the other set of parallel spaced boundary plates 2. A constant magnetic field B, produced by any suitable means known per se but not shown, is directed parallel with and between the set of parallel spaced plates 1. A source of alternating current, voltage U, is connected to the set of plates 1. This alternating current flowing between plates 1 together with the magnetic field B of constant direction, results in application of an alternating force to the liquid 3. Liquid 3 therefore oscillates in a direction $v$ perpendicular to the direction of magnetic field B and also perpendicular to the direction of the electric field E. Such oscillation, in turn, induces an electric field which, together with the impressed field, determines the current.

It is found that the arrangement shown in FIG. 1 is equivalent to a "lossy" capacitance. The oscillating liquid has an apparent relative dielectric constant of $4\pi c^2\rho/B^2$, $c$ denoting the speed of light in vacuo, $\rho$ denoting the density of the liquid and B denoting the constant magnetic induction. The ratio of the capacitative reactive power to the power loss is given $(\sigma B^2)/(2\pi f\rho)$, $\sigma$ denoting the electrical conductivity of the liquid and $f$ denoting the frequency of the impressed voltage. For instance, if the magnetic induction B is $4\times10^4$ gauss and the liquid used is liquid sodium having a temperature of about 160° C., a density $\rho$ of 0.93 g./cm.$^3$ and an electrical conductivity $\sigma$ of $10^{-4}$ CGS units, the effective relative dielectric constant is about $7\times10^{12}$, while the ratio of reactive power to ohmic dissipation at a frequency $f$ of 50 c./s. is about 400.

Hydraulic friction increases the losses. It is found that the ratio of the capacitative reactive power to the power loss or dissipation due to laminar friction is approximately given by the expression $\sqrt{2}\times\pi fa^2/\nu$, $a$ denoting the hydraulic diameter for the flow cross-section of the liquid oscillation and $\nu$ denoting the kinetic viscosity of the liquids. For sodium at 100° C., which has a value $\nu$ of 0.0075 Stokes, and for $a=5$ cm., this expression becomes $10^6$ for a frequency $f$ of 50 c./s. If allowance is made for turbulence, the power loss can be taken to be of the same order of magnitude as the dissipated loss. In the present case, therefore, the ratio of reactive power to total power loss is about 200.

The electric field strength in the capacitance is limited by the induced speed of the oscillating column of liquid. Assuming an electric field strength of 3 v./cm. and the magnetic field previously assumed of $4\times10^4$ gauss, a maximum speed of 75 m./s. is induced. The corresponding dynamic pressure is 30 atmospheres and the amplitude of oscillation is approximately 25 cm. Assuming this electric field strength, the size of the capacitance is about half the active size of the magnetic hydrodynamic generator.

Figure 2:
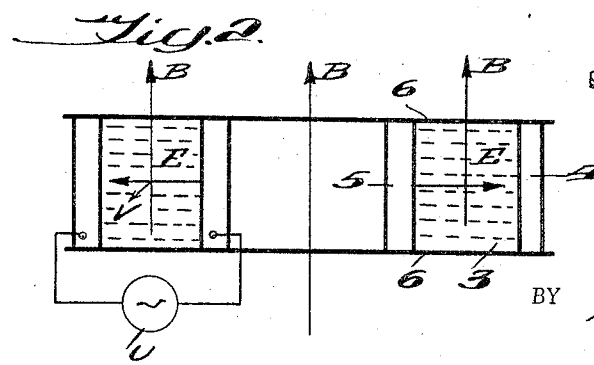
FIG. 2 illustrates the improved capacitance having the form of an annulus and the electrically conductive member being a liquid, this view being a diametral section through the same.

FIG. 2 is a sectioned view showing the basic construction of an annular capacitance which also utilizes a liquid type capacitance member. There can be seen cylindrical coaxial annular electrode plates 4, 5 between which the conducted liquid 3 is received. Top and bottom boundary plates 6 are provided. The magnetic field B extends axially and the alternating electric field E extends radially. The liquid dielectric 3 oscillates at a tangent to the annulus. The advantage of this arrangement over the arrangement shown in FIG. 1 is that no storage zones are required at the ends of the capacitance chamber to receive the inflowing and outflowing liquid. Also, effects due to the liquid flowing in and out are obviated.

FIGS. 3*a* and 3*b* show an embodiment of a capacitance for connection to a three-phase A.C. source. The capacitance is shown in longitudinal section in FIG. 3*a*, the corresponding horizontal section being shown in FIG. 3*b*. Annular channels 7, 7′, 8, 8′, 9, 9′ are bounded by cylindrical coaxial side walls 10 and bottom plates 11 and are disposed one above another. The side walls 10 and bottom plates 11 are made of an insulating material. Cylindrical electrodes 12 are mounted on the side walls 10. The channels are filled with a conductive liquid, such as sodium. The magnetic field B, which is operative axially, is produced by two coaxial energizing windings 13, 14 connected to a source of direct current (not shown). An iron core 15 serves as a magnetic return. If required, the iron core can be omitted.

The result of arranging connections 16 and 17 to the electrodes 12 in the manner shown in FIG. 3*a* is that the channels are subdivided into three groups 7–7′, 8–8′ and 9–9′, the channels of any one group being disposed one above another. The groups can therefore be star or delta connected via the connections 16 and 17 to the various phases of a three-phase A.C. source. The various channels in any one group can be connected in series or parallel as required to suit the voltage of the A.C. source. Advantageously, channels are provided to an even number in every group connected to a phase and the polarity of the electric field changes from one channel to the next. The dynamic forces of adjacent liquid rings are therefore always opposed to one another so that the capacitance is dynamically balanced externally. In the example shown four channels are provided per phase group, and the channels in any one group are connected in series, the polarity of the electric field E alternating—i.e., if the electric field E in the channel 7 is directed radially inwards, the electric field E in the adjacent channel 7′ is directed radially outwards.

FIG. 4 illustrates an alternative form of capacitance for connection to a three-phase A.C. source. The construction of the channels for oscillation of the liquid and the electrode connections are as in the capacitance illustrated in FIGS. 3*a*, 3*b* and will not be described in greater detail. The constant magnetic field B is produced by two or more shell yokes 18 in the form of spokes as well as by an iron core 15 wound with an inner winding 13. If required, windings 19 can be wound around the outside of the yokes 18. As will be apparent, the direction of the magnetic field B differs considerably from the direction in a shell type transformer since the effective field passes through the channels disposed between pole shoes 20.

The embodiments shown in FIGS. 3*a*, 3*b* and 4*a*, 4*b* can also be connected to a single-phase A.C. source, in which event the circuit need not be subdivided into groups corresponding to the various phases. However, the channels are, with advantage, provided to an even number in a single-phase arrangement just as in a polyphase arrangement, the electric field in adjacent channels being oppositely polarized so that the arrangement is dynamically balanced externally. Advantageously, a positive pressure is operative in the channels to reduce cavitation.

In the embodiments described, alternating current (A.C.) capacitances have been described wherein a liquid conductive member experiences a constant magnetic field and also the electric field produced by the applied A.C. voltage. Another possibility provided by the invention is to use a solid, electrically conductive and nonferromagnetic member, for instance, of aluminum.

FIG. 5 shows an embodiment of the capacitance using a solid electrically conductive member. Individual aluminum rings 22 which are insulated from one another are combined to form annular aluminum blocks 21 which are secured to circular brackets 23 so mounted on a column 25, with the interposition of roller bearings 24, as to be rotatable. The magnetic field B is produced by cylindrical inner windings 26 and by cylindrical outer windings 27 both connected to a D.C. source (not shown). Each block 21 secured to a bracket 23 has separate windings which are rigidly connected mechanically to the column 25. The various rings 22 have current pickup means 28 in the form of flexible conductors or rubbing contacts. Since the individual rings 22 are insulated from one another, they can be interconnected in any desired series or parallel arrangement and connected via wiring 29 to the A.C. source. Advaantageously, and as shown in FIG. 5, the various rings 22 connected to any one phase of the A.C. source are rigidly interconnected mechanically to form a block 21. To ensure that the oscillations in any one block are always cophasal, the electric field E must be applied with the same polarity to all the rings forming the particular block concerned. In the case of a polyphase capacitance, the blocks connected to the various phases must, as shown in FIG. 5, be disposed coaxially one above another with freedom of movement, to ensure external balancing of dynamic forces. Advantageously, in a single-phase arrangement the capacitance is subdivided into two parts oscillating in opposite senses to one another. Instead of the roller bearings used in FIG. 5, other anti-friction mountings or the like can be used, such as a hydraulic or pneumatic or resilient or articulated mounting.

If the capacitance is of the linear kind basically shown in FIG. 1 and the conductive member used is a liquid, various channels can be so disposed one above or one beside another, and can be connected to the A.C. voltage with such a polarity, that a dynamic balancing is provided. Similarly, the various channels can be electrically connected in series and/or parallel for impedance matching to the available A.C. source. The channels have storage areas at both ends, but the amplitude of oscillation is small enough for the storage zones not to be very large.

FIG. 6 shows an embodiment for a linearly arranged capacitance comprising a solid conductive member, in the form of a block and its mounting, the block comprising four individual elements. The current supply means and the windings for producing the magnetic field B are not shown. The aluminum elements 30 are insulated from one another and rigidly interconnected mechanically to form a block 31. A linear slideway 32 is provided. A roller slideway can be provided instead of the linear slideway 32.

I claim:

1. In a magneto-dynamic alternating current capacitance for use in compensating for reactive power, the combination comprising an electrically conductive non-ferromagnetic member which has an annular configuration, means subjecting said member to a magnetic field which has an essentially constant magnitude and an essentially constant direction axially of said annular member, and means also subjecting said member to an alternating current which is passed through said annular member in a radial direction, said annular member being supported for free rotation about its axis.

2. A magneto-dynamic capacitance as defined in claim 1 wherein said electrically conductive annular non-ferromagnetic member is constituted by a liquid contained within radially spaced inner and outer cylndrical side walls which function as electrodes for applying the alternating current.

3. A magneto-dynamic capacitance as defined in claim 1 which comprises a plurality of said electrically conductive annular non-ferromagnetic members, said annular members being arranged coaxially in a superposed manner and being insulated from each other.

4. A magneto-dynamic capacitance as defined in claim 1 which comprises a plurality of said electrically conductive annular non-ferromagnetic members in liquid form and which are bounded at the inner and outer peripheries thereof by cylindrical walls serving as electrodes, said annular liquid members being arranged coaxially in a superposed manner and being insulated from each other, said constant magnetic field extending axially of said annular liquid members and said alternating current being passed through said annular liquid members in a radial direction, the alternating current at any instant flowing radially outward through one member and radially inward through an adjacent member.

5. A magneto-dynamic capacitance as defined in claim 4 wherein there are an even number of said annular electrically conductive non-ferromagnetic members.

6. A magneto-dynamic capacitance as defined in claim 4 wherein said plurality of electrically conductive non-ferromagnetic members are arranged into groups of at least one such member each, and the members of each said group are connected respectively to different phases of a polyphase alternating current source.

7. A magneto-dynamic capacitance as defined in claim 4 wherein said plurality of electrically conductive non-ferromagnetic members are arranged in two groups of at least one such member each, said groups being connected to a single phase source of alternating current such that the current flows in the two groups in directions opposite to one another.

8. A magneto-dynamic capacitance as defined in claim 1 wherein said electrically conductive annular non-ferromagnetic member is a solid of rectangular cross section and wherein said means for subjecting said member to an alternating current including current supply means on its radially inner and outer surfaces.

9. A mageto-dynamic capacitance as defined in claim 8 wherein there are included a plurality of said annular solids interconnected rigidly and arranged coaxially in superposed relation and insulated from each other.

10. A magneto-dynamic capacitance as defined in claim 9 wherein said annular solids are arranged in groups of at least one annular solid each, and those solids of each group which have the same polarity are connected to one phase of a source of polyphase alternating current.

11. A magneto-dynamic capacitance as defined in claim 9 wherein said annular solids are arranged in two groups of at least one annular solid each, and said annular solids of said groups are connected to a single phase source of alternating current in such manner that the alternating current flows through the annular solids of the two groups in opposite directions.

References Cited

UNITED STATES PATENTS 2,764,732 9/1956 Wiegand ------------ 310—11

FOREIGN PATENTS 4,028 1909 Great Britain.

DAVID X. SLINEY, *Primary Examiner.*